(12) United States Patent
Nicolini

(10) Patent No.: US 12,146,586 B2
(45) Date of Patent: Nov. 19, 2024

(54) VALVE ASSEMBLY FOR PRESSURIZED CONTAINERS

(71) Applicant: CAVAGNA GROUP S.P.A., Calcinato (IT)

(72) Inventor: Giancarlo Nicolini, Villanuova Sul Clisi (IT)

(73) Assignee: CAVAGNA GROUP S.P.A., Calcinato (BS) (IT)

( * ) Notice: Subject to any disclaimer, the term of this patent is extended or adjusted under 35 U.S.C. 154(b) by 0 days.

(21) Appl. No.: 18/009,937

(22) PCT Filed: Jun. 18, 2021

(86) PCT No.: PCT/IB2021/055400
§ 371 (c)(1),
(2) Date: Dec. 12, 2022

(87) PCT Pub. No.: WO2021/255702
PCT Pub. Date: Dec. 23, 2021

(65) Prior Publication Data
US 2023/0258280 A1 Aug. 17, 2023

(30) Foreign Application Priority Data

Jun. 18, 2020 (IT) ........................ 102020000014632

(51) Int. Cl.
| | |
|---|---|
| *F16K 31/60* | (2006.01) |
| *F16K 37/00* | (2006.01) |
| *F17C 13/04* | (2006.01) |

(52) U.S. Cl.
CPC .......... *F16K 31/60* (2013.01); *F16K 37/0033* (2013.01); *F16K 37/0041* (2013.01);
(Continued)

(58) Field of Classification Search
CPC .. F16K 31/60; F16K 37/0033; F16K 37/0041; F16K 37/0058; F17C 13/04;
(Continued)

(56) References Cited

U.S. PATENT DOCUMENTS

| | | | | |
|---|---|---|---|---|
| 467,796 A | * | 1/1892 | Ferrell | F16K 37/0008 |
| | | | | 137/553 |
| 1,994,336 A | * | 3/1935 | Dawson | F16K 41/00 |
| | | | | 137/553 |

(Continued)

FOREIGN PATENT DOCUMENTS

| | | |
|---|---|---|
| DE | 202012005430 U1 | 7/2012 |
| EP | 3026311 A1 | 6/2016 |

*Primary Examiner* — Minh Q Le
(74) *Attorney, Agent, or Firm* — Volpe Koenig

(57) ABSTRACT

A valve assembly for pressurized containers includes a main structure, a rotary control element rotatably connected to the main structure and configured so as to allow a gas flow through the valve assembly in accordance with an angular position thereof about a main rotation axis, a detection device which includes an angular position sensor and a movable member. The angular position sensor is configured to detect the angular position of the movable member about an auxiliary rotation axis. The movable member is rotatably supported on the main structure and the angular position sensor is fixed to the main structure. The valve assembly further includes a movement conversion mechanism configured so as to convert the movement of the rotary control element about the main axis into a corresponding rotational movement of the movable member about the auxiliary axis which is different with respect to the main rotation axis.

13 Claims, 3 Drawing Sheets

(52) U.S. Cl.
CPC .......... *F17C 13/04* (2013.01); *F16K 37/0058* (2013.01); *F17C 2201/0104* (2013.01); *F17C 2205/0308* (2013.01); *F17C 2205/0329* (2013.01); *F17C 2221/011* (2013.01); *F17C 2221/031* (2013.01); *F17C 2223/0123* (2013.01); *F17C 2223/035* (2013.01); *F17C 2250/036* (2013.01); *F17C 2250/0473* (2013.01); *F17C 2250/0478* (2013.01); *F17C 2250/0694* (2013.01); *F17C 2270/02* (2013.01); *F17C 2270/025* (2013.01); *F17C 2270/05* (2013.01)

(58) Field of Classification Search
CPC ...... F17C 2201/0104; F17C 2205/0329; F17C 2221/011; F17C 2221/031; F17C 2250/0473; F17C 2250/0478; F17C 2250/0694; F17C 2270/02; F17C 2270/05; F17C 2205/0308; F17C 2223/0123; F17C 2223/035; F17C 2250/036; F17C 2270/025
USPC .................. 137/553, 315.38, 315.17, 544
See application file for complete search history.

(56) References Cited

U.S. PATENT DOCUMENTS

| | | | | |
|---|---|---|---|---|
| 2,443,036 A | * | 6/1948 | Hopkins | F16K 1/2085 137/553 |
| 2,767,681 A | * | 10/1956 | Pontius | F16K 37/0016 137/553 |
| 2,768,604 A | * | 10/1956 | Olaf | F16K 37/0008 137/553 |
| 2,959,149 A | * | 11/1960 | Schwenk | F16K 37/0008 116/281 |
| 3,002,529 A | * | 10/1961 | Bowman | F16K 37/0008 137/553 |
| 3,505,972 A | * | 4/1970 | Benjamin | F16K 37/0016 137/553 |
| 3,785,338 A | * | 1/1974 | Visser | F16K 37/0008 137/553 |
| 4,411,288 A | * | 10/1983 | Gain, Jr. | F16K 37/0008 137/553 |
| 4,438,781 A | * | 3/1984 | Brenholt | F16K 3/085 137/553 |
| 4,771,807 A | * | 9/1988 | Karani | F16K 31/05 137/553 |
| 5,224,512 A | * | 7/1993 | Nogami | F16K 37/00 137/553 |
| 5,640,007 A | * | 6/1997 | Talbott | G01D 5/3473 250/231.18 |
| 7,845,616 B2 * | | 12/2010 | Hatsuzawa | G01D 5/2073 137/554 |
| 8,608,128 B2 * | | 12/2013 | Dolenti | G01L 5/12 251/129.11 |
| 9,562,623 B2 * | | 2/2017 | Clark | F16K 37/0041 |
| 10,151,405 B1 * | | 12/2018 | Tebebi | F16K 37/005 |
| 10,228,091 B2 * | | 3/2019 | Carron | F17C 13/025 |
| 11,054,057 B2 * | | 7/2021 | Dolenti | F16K 37/0041 |
| 11,920,333 B2 * | | 3/2024 | Ratliff | E03D 5/024 |
| 2003/0136929 A1 * | | 7/2003 | Clemens | F16K 37/0083 137/554 |
| 2004/0045608 A1 * | | 3/2004 | Peters | F17C 13/045 137/552.7 |
| 2012/0211098 A1 * | | 8/2012 | Evatt | F16K 5/0647 137/553 |
| 2013/0068974 A1 * | | 3/2013 | Galka | F16K 1/22 324/207.25 |
| 2016/0153581 A1 * | | 6/2016 | Giubertoni | F16K 31/60 137/553 |
| 2016/0348844 A1 * | | 12/2016 | Carron | G05B 19/406 |
| 2018/0100604 A1 * | | 4/2018 | Lee | F17C 13/04 |
| 2018/0119887 A1 * | | 5/2018 | Rezel | F17C 13/04 |
| 2018/0135772 A1 * | | 5/2018 | Gundlach | H02K 7/1166 |
| 2019/0017625 A1 * | | 1/2019 | Morris | F16K 31/043 |
| 2020/0003319 A1 * | | 1/2020 | Musolesi | G01D 11/245 |
| 2020/0088548 A1 * | | 3/2020 | Bund | G01D 5/24461 |
| 2020/0132217 A1 * | | 4/2020 | Gismervik | F16K 37/0041 |
| 2020/0132218 A1 * | | 4/2020 | Plummer | F16K 37/0033 |
| 2020/0284307 A1 * | | 9/2020 | Williams | F16K 37/0041 |
| 2020/0333809 A1 * | | 10/2020 | Ollander | F16K 37/005 |
| 2020/0378526 A1 * | | 12/2020 | Nelson | G01D 5/02 |
| 2021/0131586 A1 * | | 5/2021 | Larsen | F16K 37/0033 |
| 2022/0057015 A1 * | | 2/2022 | Smith | F16K 37/0008 |
| 2022/0214015 A1 * | | 7/2022 | Mary | F17C 13/025 |
| 2023/0139080 A1 * | | 5/2023 | Smith | F16K 37/0083 137/553 |
| 2023/0258280 A1 * | | 8/2023 | Nicolini | F16K 31/60 137/554 |

\* cited by examiner

VALVE ASSEMBLY FOR PRESSURIZED CONTAINERS

The present invention relates to a valve assembly of the type comprising an interception device which is capable of intercepting an outlet opening of the valve assembly in order to prevent the flow of gas being discharged, and a rotary control element which is configured to move the interception device from a closed position to an open position.

More generally, the present invention is used, though not exclusively, in the technical field of the storage of technical and medical gases inside suitable pressurized containers which are also commonly known as "gas cylinders".

Such containers are widely used as containers for gas under high pressure, such as, for example, oxygen, air, industrial gases and gases for medical and domestic use, and provide for the presence of suitable valves which are provided with various functions and which are intended, for example, to supply the gas and to control the pressure thereof.

Typically, the valves used in the gas cylinders are provided with a pressure indicator in order to allow the display of the pressure value of the gas which is contained in the gas cylinder.

There may further be available valves which are equipped with electronic devices which allow the addition of other functions in addition to the one for displaying the pressure value of the gas contained in the gas cylinder.

By way of example, such electronic devices may comprise pressure sensors for reading the pressure in the gas cylinder, thermal sensors for detecting the temperature of the system, the use of logic units capable of processing these data affording the possibility of predicting the end of use in accordance with the current consumption, alarm systems which are connected to combinations of the data considered to be at risk.

In some technical fields, there is particularly perceived the need to be able to have a rapid response of the logic systems used in the valves, for example, for the purpose of a precise supply of the gas, in particular in the first moments of opening of the valve.

The Applicant of the present patent application has observed that the time necessary until the logic unit processes the information items acquired by the sensor of the magnitudes of the gas cylinder interior and is able to provide a first hypothesis of the duration in accordance with the current consumption depends on the volume of the gas cylinder and the current gas flow.

In fact, considering that the prediction of supply is calculated by measuring the pressure variation, under predetermined conditions (large gas cylinder volume and small flows), the response time does not comply with the information needs of users.

An example of a valve provided with various types of sensors is described in the American patent application US 2016/0348844.

In this document, there is also provision for the use of position sensors of various types in order to detect the position of the control element of the valve.

Inter alia, there is further described the use of a rack type mechanism which acts on a potentiometer which is intended to detect the position of the control element.

However, this solution is particularly complex from the constructive point of view and requires an increase in the overall dimensions of the valve.

Therefore, the problem addressed by the present invention is to provide a valve assembly which is structurally and functionally configured to at least partially overcome one or more of the disadvantages set out with reference to the cited prior art.

Another objective is to provide a valve assembly, in which the position of the control element can be suitably detected in any angular position thereof. Another objective of the present invention is to provide a valve assembly which is provided with the function of detecting the angular position of the control element which is structurally simple and which has dimensions which are comparable with the other known solutions.

This problem is solved and these objectives are achieved by the invention by means of a valve assembly for pressurized containers comprising a main structure and a rotary control element which is rotatably connected to the main structure and which is configured so as to allow a gas flow through the valve assembly in accordance with an angular position thereof about a main rotation axis.

The valve assembly includes a detection device which comprises an angular position sensor and a movable member. The angular position sensor is configured to detect the angular position of the movable member about an auxiliary rotation axis.

The movable member is rotatably supported on the main structure while the angular position sensor is fixed to the main structure.

The valve assembly further comprises a movement conversion mechanism which is configured so as to convert the movement of the rotary control element about the main axis into a corresponding rotational movement of the movable member about the auxiliary axis. The auxiliary axis is different with respect to the main rotation axis.

The auxiliary rotation axis is preferably transverse or parallel and non-aligned with respect to the main rotation axis.

It will be appreciated that, as a result of it being possible to detect precisely the position of the control element during the supply, it is possible to instruct the logic unit to supply, in the first moments of use, coherent hypotheses for duration based on a calculation routine.

The use of a mechanism which is capable of converting the rotation of the control element into rotation about a different axis further advantageously allows the sensor portion to be moved outside the control element, contributing to the construction simplicity of the valve assembly. At the same time, the rotational movement transmitted allows a solution which requires small dimensions to be obtained.

Preferably, the angular position sensor is a TMR magnetic tunnel effect angle sensor.

According to some aspects of the invention, the angular position sensor defines a detection axis Y' which is aligned with the auxiliary rotation axis.

On the basis of this aspect, therefore, the sensor can be aligned with the magnet present in the movable member.

This feature contributes to minimizing the energy consumption of the sensor, advantageously allowing a long duration of the batteries necessary for the operation thereof.

The use of a sensor of the TMR type is further particularly advantageous for the measurement precision and for reduced consumption levels.

In some embodiments, the movement conversion mechanism comprises a first toothed portion which is fixedly joined to the control element in terms of rotation and a second toothed portion which is fixedly joined to the movable member in terms of rotation and which engages with the first toothed portion.

Preferably, the first toothed portion is constructed at a collar which is formed in the control element.

As a result of these aspects, it is possible to construct a particularly simple and reliable mechanism with small dimensions.

Preferred features of the invention are more generally defined by the dependent claims.

The features and advantages of the invention will be better appreciated from the detailed description of a number of embodiments thereof which are illustrated by way of non-limiting example with reference to the appended drawings, in which:

FIG. 1 perspective view of a valve assembly according to the present invention;

Figure 1:
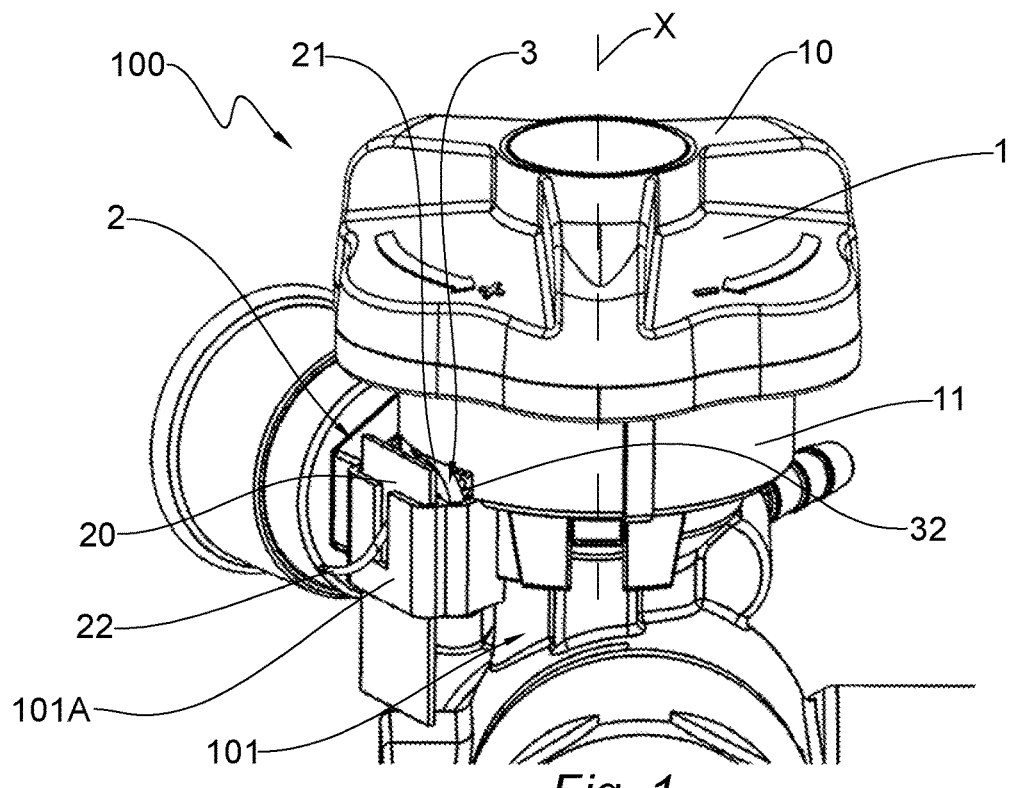

Initially with reference to FIG. 1, a valve assembly according to the present invention is generally designated 100.

Figure 4:
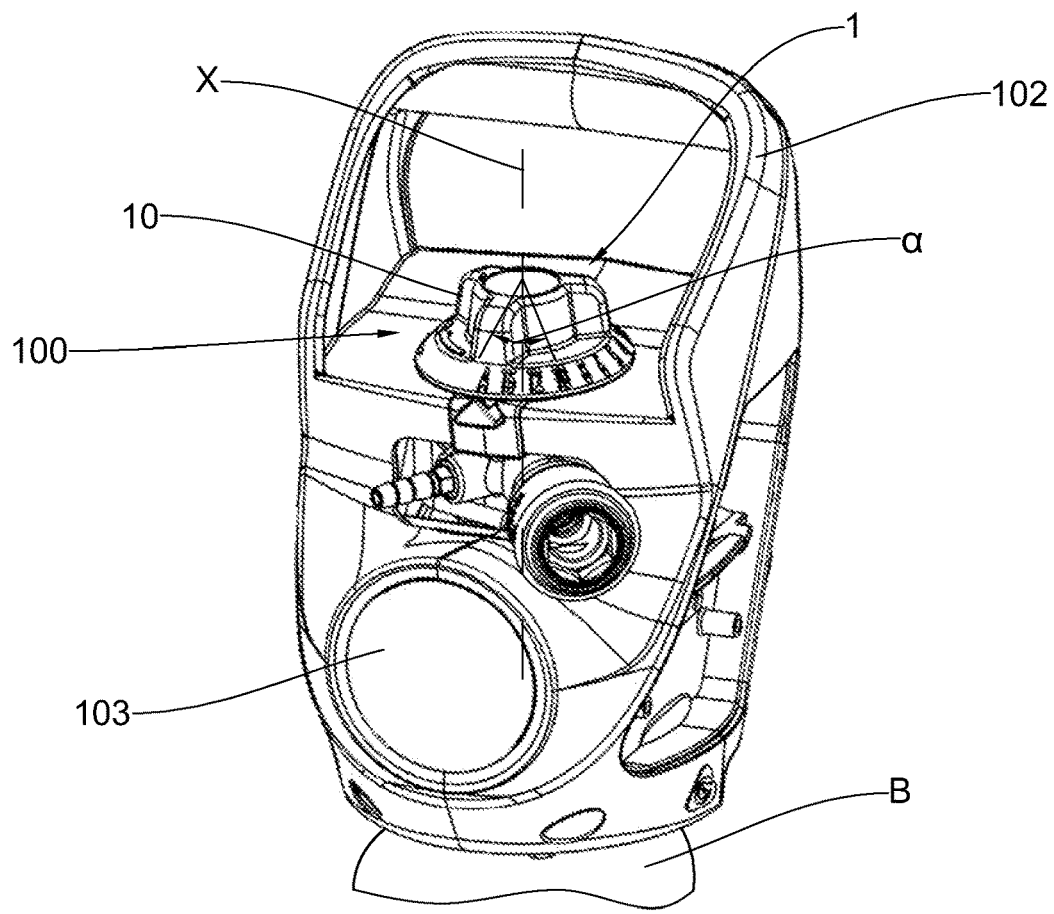
FIG. 4 is a perspective view of a valve assembly according to the present invention during the use of a pressurized container.

The valve assembly 100 is of the type intended to be used in pressurized containers, for example, a gas cylinder B, in order to control the discharge and where applicable the introduction during the recharging step, of the pressurized gas present inside the container, as illustrated in the embodiment depicted in FIG. 4.

The valve assembly 100 may advantageously be combined with a protection shell 102 which is provided where applicable with a handle, and a display or other display device 103 capable of indicating parameters or conditions characteristic of the gas present inside the container. Preferably, the valve assembly 100 comprises a control element 1 which can partially project from the protection shell 102 in order to allow the manual actuation thereof by acting on a suitable gripping portion 10.

On the basis of an aspect of the invention, when the control element 1 is rotated in one direction, there is released a passage of gas being discharged by the valve assembly 100 while a rotation in the opposite direction then brings about the closure thereof again. To this end, the valve assembly 100 may comprise an interception device which is not illustrated in the Figures and which is capable of intercepting a gas discharge opening. When the interception device is closed, the discharge of the gas is prevented while, by rotating the control element, the interception device is opened and the gas can be supplied.

The rotation of the control element 1 is preferably carried out about a main rotation axis X.

Now with reference to FIG. 1, the valve assembly of the present invention further comprises a detection device 2, by means of which there can be determined, indirectly, the angular position α of the control element 1. In this manner, the detection device 2 may detect any rotations of the control element 1 and the resultant opening of the interception device and therefore generally of the valve assembly 100.

Figure 2:
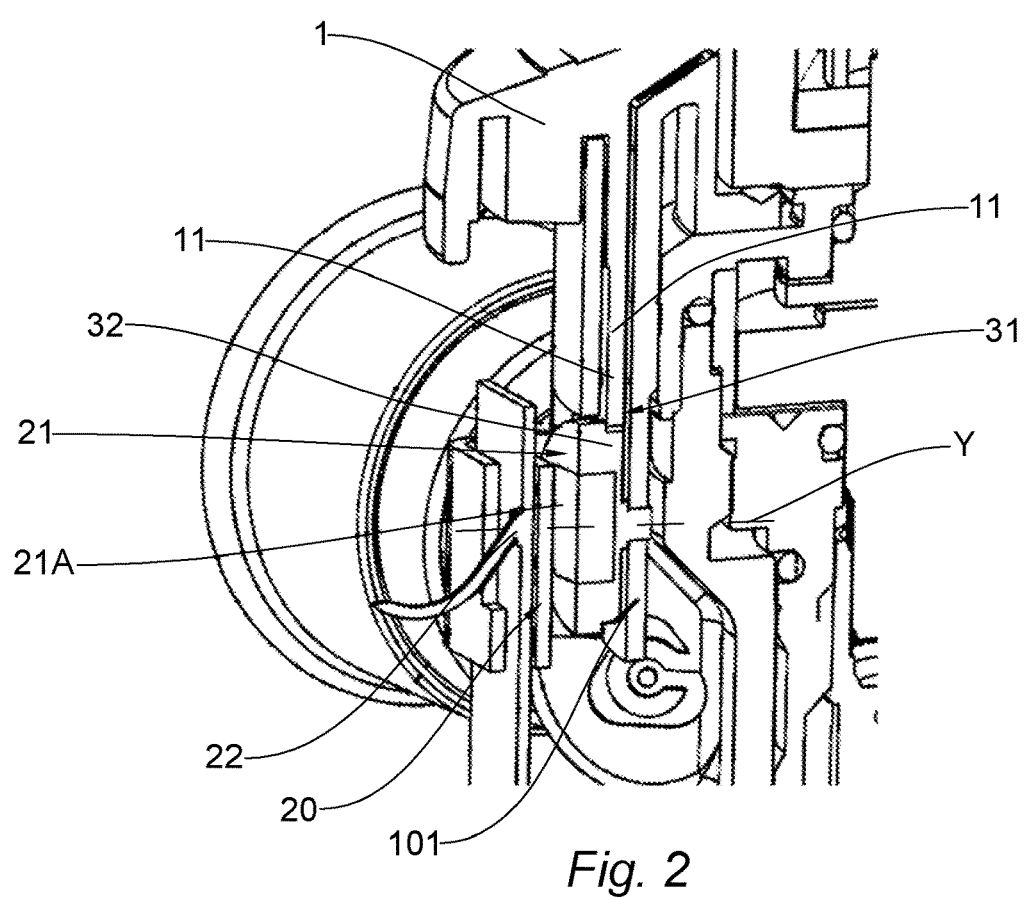
FIG. 2 is a perspective sectional view of a detail of the valve assembly of FIG. 1.
Figure 3:
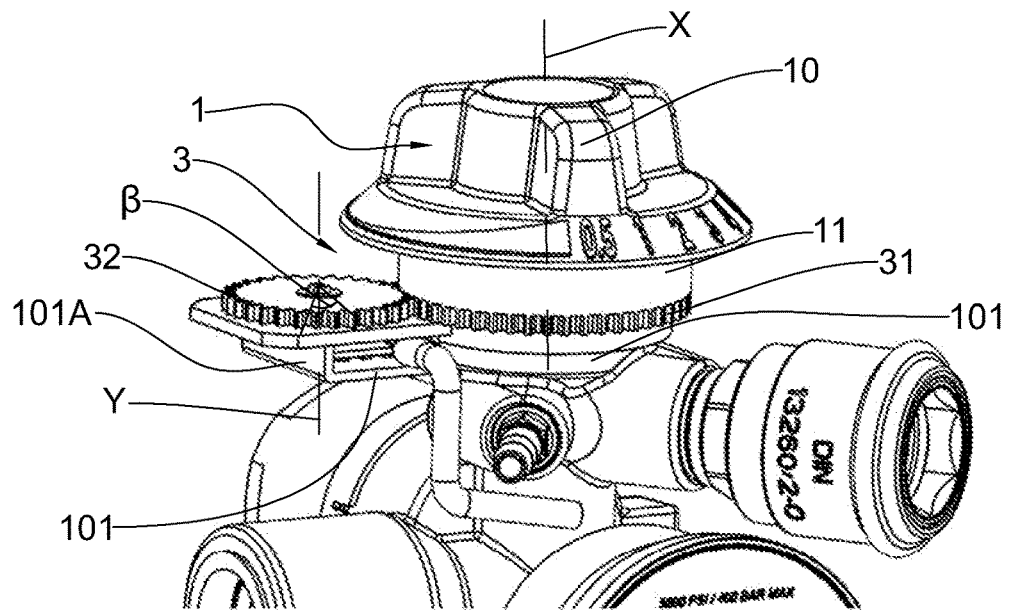
FIG. 3 is a perspective view of a valve assembly according to an alternative embodiment of the present invention.

In some embodiments, the detection device 2 includes an angular position sensor 20 and a movable member 21, preferably comprising a magnet 21A, as better illustrated in the example of FIG. 2.

The movable member 21 is advantageously rotatably supported on the main structure about an auxiliary rotation axis Y.

As will be better appreciated below, the auxiliary rotation axis Y is different with respect to the main rotation axis X of the control element. In other words, the two axes are not aligned with each other.

In some embodiments, such as the one illustrated in FIG. 1, the rotation axis Y is perpendicular to the rotation axis X.

In some construction variants, the rotation axis Y may be parallel and not aligned with the axis X.

Generally, the detection device is arranged laterally relative to the control element 1, that is to say, arranged at the side thereof in a radial direction with respect to the axis X.

According to another aspect of the invention, the angular position sensor 20 is configured to detect the angular position of the movable member 21 about the auxiliary rotation axis Y.

To this end, the movable member 21 is advantageously supported rotatably on the main structure 101 and the angular position sensor 20 is fixed to the main structure 101.

In some embodiments, the main structure 101 may comprise a support arm 101A which projects radially with respect to the direction defined by the main rotation axis X and which is configured to support the angular position sensor 20.

In preferred embodiments, the angular position sensor 20 is a magnetic tunnel effect angle sensor (TMR).

Figure 5:
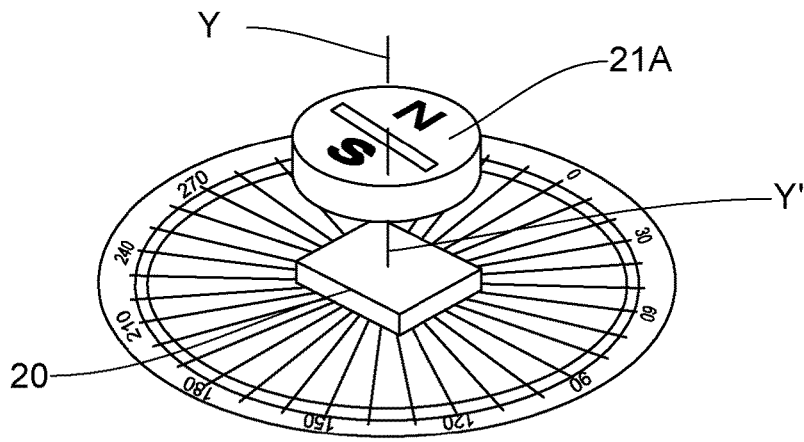
FIG. 5 is a schematic illustration of a detection device used in the valve assembly of the present invention.

As may be observed from the example of FIG. 5, the angular position sensor 20 preferably defines a detection axis Y' which is, where applicable, formed by the geometric centre of the sensor 20 and which may advantageously be aligned with the auxiliary axis Y.

In other words, the magnet 21A and the sensor are coaxial so as to optimize the operation of the device.

It will be appreciated that, in some embodiments, the magnet 21A has a substantially disk-like form and is precisely coaxial with the auxiliary rotation axis Y.

In order to transmit the movement from the control element 1 to the movable member 20, the valve assembly 100 comprises a movement conversion mechanism 3.

The movement conversion mechanism 3 is advantageously configured so as to convert the movement of the rotary control element 1 about the main axis X into a corresponding rotational movement of the movable member 21 about the auxiliary axis Y.

The movement may advantageously be brought about with a gearing-up gear ratio in order to increase the sensitivity of the sensor. In some embodiments, such as, for example, the one illustrated in FIG. 6, a movement reduction unit 33 may be provided.

In some embodiments, the movement conversion mechanism 3 comprises a first toothed portion 31 which is fixedly joined to the control element 1 in terms of rotation and a second toothed portion 32 which is fixedly joined to the movable member 20 in terms of rotation and which engages with the first toothed portion 31.

In other words, the transmission of the movement can be carried out by means of a gear system.

Figure 6:
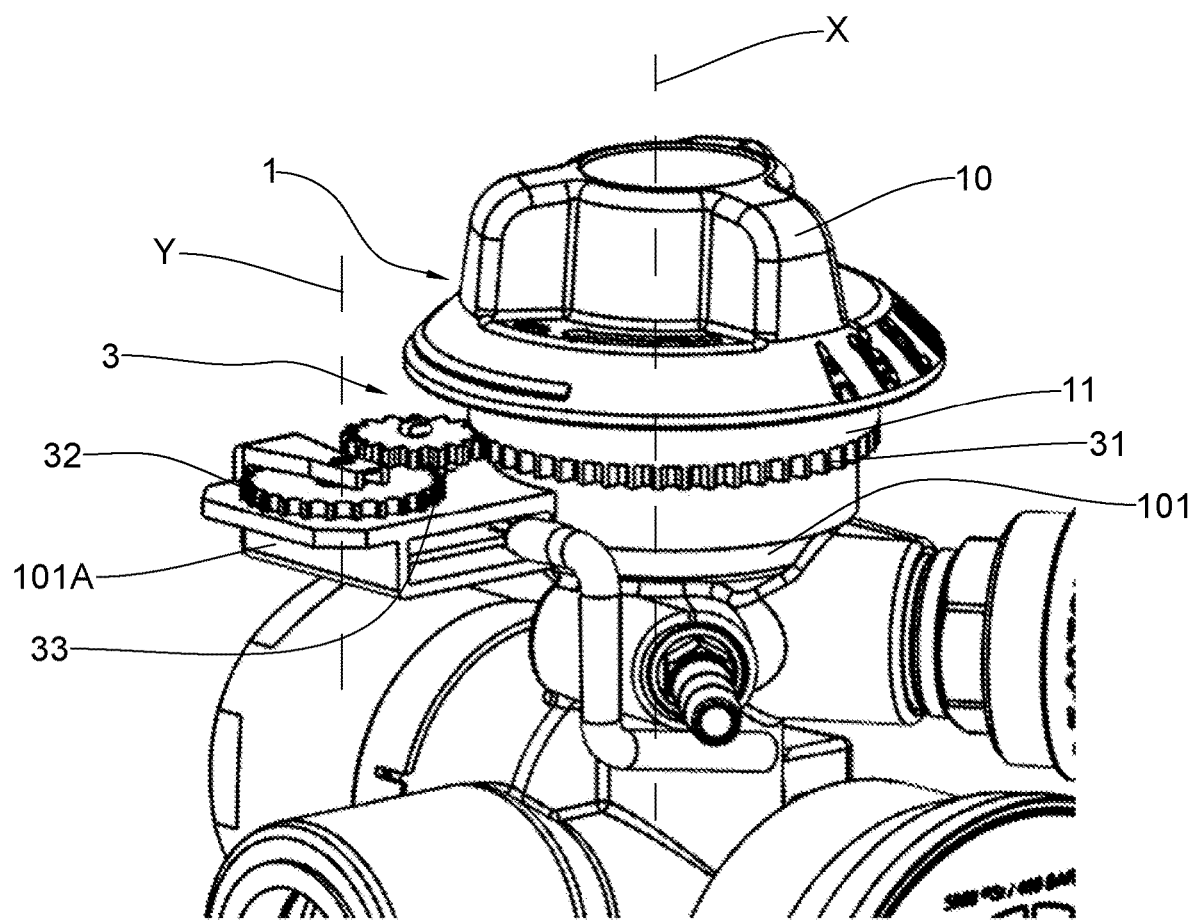
FIG. 6 is a perspective view of a valve assembly according to another alternative embodiment of the present invention.

In the example of FIG. 6, the reduction unit is advantageously formed by a pair of coaxial gears which engage with the first toothed portion 31 and the second toothed portion 32, respectively.

Naturally, there may in any case be provided other movement transmission systems, such as, for example, ones using friction, and other types of reduction units.

Preferably, the first toothed portion 31 is constructed at a collar 11 which is formed in the control element 1, as depicted more clearly in FIG. 2.

In some embodiments, the collar 1 is formed in a position, during use, lower than the gripping portion 10 so that the presence of the movement conversion mechanism 3 does not make it impossible to manipulate the control element 1.

Therefore, it will be appreciated that the valve assembly according to the present invention allows the implementation of effective detection of the angular position of the control element 1 without requiring complex construction solutions or substantial variations during the construction of the control element 1.

The data item obtained by the sensor can further advantageously be transmitted, preferably by means of a suitable wire 22, to a control device which is advantageously integrated in the display 103 in order to take account of the position of the control element 1 during the establishment of the characteristic parameters of the gas, both during the storage step in the gas cylinder and during the supply step.

In preferred embodiments, therefore, this information can be used to establish a residual supply time for the gas present inside the gas cylinder. In other words, when the supply of the gas takes place by acting on the control element 1, the angular position thereof can be detected in a substantially immediate manner by means of the position sensor 20.

This data item can advantageously be used to estimate, where applicable in conjunction with other parameters, such as, for example, pressure of the gas cylinder and/or dimensions thereof, the flow of gas being discharged and, consequently, the residual supply time. This solution advantageously allows the acquisition of a value which is also sufficiently reliable in limited situations, for example, in the first moments of opening or with the gas cylinder being depleted.

In order to obtain the estimate of the residual time according to what has been set out above, the angular position sensor 20 can advantageously be configured so as to transmit to the control device the data items acquired in relation to the angular position of the rotary control element 1.

The control device may further be interfaced with the display device 103 so as to display the estimated residual time or other characteristic parameters of the gas present inside the gas cylinder.

In this manner, the user can be readily informed about the duration of possible supply of gas by the gas cylinder, limiting the risks of depletion of the gas.

The invention claimed is:

1. A valve assembly for pressurized containers, the valve assembly comprising a main structure, a rotary control element which is rotatably connected to the main structure and which is configured so as to allow a gas flow through the valve assembly in accordance with an angular position (a) of said rotary control element about a main rotation axis, a detection device which includes an angular position sensor and a movable member including a gear, the angular position sensor being configured to detect the angular position of the gear about an auxiliary rotation axis, wherein the gear is rotatably supported on the main structure and the angular position sensor is fixed to the main structure, wherein the main structure comprises a support arm which projects radially with respect to the main rotation axis and which defines a housing configured to support the angular position sensor and to rotatably support the gear, the gear of the movable member comprising a magnet, wherein the valve assembly further comprises a movement conversion mechanism which is configured so as to convert the movement of the rotary control element about the main axis into a corresponding rotational movement of the gear about the auxiliary axis, the auxiliary axis being parallel and not-aligned with respect to the main rotation axis, wherein the movement conversion mechanism comprises a first toothed portion which is fixedly joined to the control element in terms of rotation and a second toothed portion formed by the gear of the movable member, the magnet being joined to the gear such that rotation of the control element determines a corresponding rotation of the magnet about the auxiliary rotation axis via the movement conversion mechanism, wherein the first toothed portion of the control element directly meshes with the gear.

2. The valve assembly according to claim 1, wherein the first toothed portion is constructed at a collar which is formed in the control element.

3. The valve assembly according to claim 2, wherein the control element comprises a gripping portion, the collar being formed in a position, during use, which is lower than the gripping portion.

4. The valve assembly according to claim 1, wherein the angular position sensor is a TMR magnetic tunnel effect angle sensor.

5. The valve assembly according to claim 1, wherein the angular position sensor defines a detection axis, the auxiliary axis being aligned with the detection axis.

6. The valve assembly according to claim 1, wherein the magnet (21A) is substantially disk-like and coaxial with the auxiliary rotation axis.

7. The valve assembly according to claim 1, further comprising a display device which is configured so as to indicate parameters or characteristic conditions of a gas present inside a gas cylinder, to which the valve assembly is applied.

8. The valve assembly according to claim 7, wherein the display device comprises a display.

9. The valve assembly according to claim 1, further comprising a control device, the angular position sensor being configured so as to transmit to the control device data items in relation to the angular position of the rotary control element, the control device being configured to determine characteristic parameters of a gas during the passage thereof through the valve assembly in accordance with the data items in relation to the angular position of the rotary control element.

10. The valve assembly according to claim 9, wherein the control device is interfaced with a display device so as to display the characteristic parameters of a gas.

11. The valve assembly according to claim 9, wherein the characteristic parameters of the gas comprise a residual supply time of the gas contained in a gas cylinder.

12. A valve assembly for pressurized containers, the valve assembly comprising a main structure, a rotary control element which is rotatably connected to the main structure and which is configured so as to allow a gas flow through the valve assembly in accordance with an angular position of said rotary control element about a main rotation axis, a detection device which includes an angular position sensor and a movable member including a gear, the angular position sensor being configured to detect the angular position of the gear about an auxiliary rotation axis, wherein the gear is rotatably supported on the main structure and the angular position sensor is fixed to the main structure, wherein the main structure comprises a support arm which projects radially with respect to the main rotation axis and which defines a housing configured to support the angular position sensor and to rotatably support the gear, the gear of the movable member comprising a magnet, wherein the valve assembly further comprises a movement conversion mechanism which is configured so as to convert the movement of the rotary control element about the main axis into a corresponding rotational movement of the gear about the auxiliary axis, the auxiliary axis being parallel and not-aligned with respect to the main rotation axis, wherein the movement conversion mechanism comprises a first toothed portion which is fixedly joined to the control element in terms of rotation and a second toothed portion formed by the gear of the movable member, the movement conversion mechanism further comprising a pair of coaxial gears having an axis parallel to the main rotation axis, the coaxial gears engaging with the first toothed portion and the second toothed portion, respectively, so as to form a transmission system between the control element and the movable member, the magnet being joined to the gear such that rotation of the control element determines a corresponding rotation of the magnet about the auxiliary rotation axis via the transmission system.

13. A valve assembly for pressurized containers, the valve assembly comprising a main structure, a rotary control element which is rotatably connected to the main structure and which is configured so as to allow a gas flow through the valve assembly in accordance with an angular position of said rotary control element about a main rotation axis, a detection device which includes an angular position sensor and a movable member, the angular position sensor being configured to detect the angular position of the movable about an auxiliary rotation axis, wherein the movable member is rotatably supported on the main structure and the angular position sensor is fixed to the main structure, wherein the main structure comprises a support arm which projects radially with respect to the main rotation axis and which defines a housing shaped as a pocket developing parallel to the main rotation axis and configured to house the angular position sensor, the movable member comprising a magnet, wherein the valve assembly further comprises a movement conversion mechanism which is configured so as to convert the movement of the rotary control element about the main axis into a corresponding rotational movement of the movable member about the auxiliary axis, the auxiliary axis being perpendicular with respect to the main rotation axis, wherein the movement conversion mechanism comprises a first toothed portion which is fixedly joined to the control element in terms of rotation and a second toothed portion formed by the movable member, the magnet being joined to the movable member such that rotation of the control element determines a corresponding rotation of the magnet about the auxiliary rotation axis.

* * * * *